United States Patent
Tang

(10) Patent No.: US 9,551,903 B2
(45) Date of Patent: Jan. 24, 2017

(54) LIQUID CRYSTAL PANEL AND LIQUID CRYSTAL DISPLAYING DEVICE

(71) Applicant: Shenzhen China Star Optoelectronics Technology Co., Ltd., Shenzhen, Guangdong (CN)

(72) Inventor: Yuejun Tang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 81 days.

(21) Appl. No.: 14/431,471

(22) PCT Filed: Jan. 13, 2015

(86) PCT No.: PCT/CN2015/070583
§ 371 (c)(1),
(2) Date: Mar. 26, 2015

(87) PCT Pub. No.: WO2016/106838
PCT Pub. Date: Jul. 7, 2016

(65) Prior Publication Data
US 2016/0187703 A1    Jun. 30, 2016

(30) Foreign Application Priority Data
Dec. 30, 2014 (CN) .......................... 2014 1 0849413

(51) Int. Cl.
*G02F 1/1339* (2006.01)
*G02F 1/1335* (2006.01)
*G02F 1/1333* (2006.01)

(52) U.S. Cl.
CPC ..... *G02F 1/13394* (2013.01); *G02F 1/133308* (2013.01); *G02F 1/133514* (2013.01); *G02F 2001/13398* (2013.01)

(58) Field of Classification Search
None
See application file for complete search history.

(56) References Cited

U.S. PATENT DOCUMENTS 5,801,797 A * 9/1998 Iida ..................... G02F 1/13336
                                                    349/139
6,275,280 B1 * 8/2001 Kajita ................. G02F 1/13394
                                                    349/106
(Continued)

FOREIGN PATENT DOCUMENTS

CN       103439836        * 12/2013
CN       103323982        *  7/2014
(Continued)

*Primary Examiner* — Ashok Patel
(74) *Attorney, Agent, or Firm* — Andrew C. Cheng

(57) ABSTRACT

A liquid crystal panel includes an array substrate and a color filter substrate that is arranged opposite to the array substrate and a liquid crystal layer interposed between the array substrate and the color filter substrate, and an enclosure resin frame surrounding the liquid crystal layer. A support is arranged in the liquid crystal layer of the liquid crystal panel and the support supports between the array substrate and the color filter substrate. The support includes a first support layer and a second support layer connected to the first support layer. The first support layer is made of a thermally deformable material. The second support layer is made of a flexible material of elastic restorability. A liquid crystal displaying device is also provided.

19 Claims, 4 Drawing Sheets

(56) References Cited

U.S. PATENT DOCUMENTS

| | | | | |
|---|---|---|---|---|
| 2009/0122242 A1* | 5/2009 | Nakamura | ........ | G02F 1/133512 349/110 |
| 2015/0226991 A1* | 8/2015 | Han | .................... | G02F 1/13394 349/43 |
| 2016/0187703 A1* | 6/2016 | Tang | ................... | G02F 1/13394 349/58 |

FOREIGN PATENT DOCUMENTS

| | | | |
|---|---|---|---|
| CN | 103913897 | * | 7/2014 |
| WO | WO2015-021716 | * | 2/2015 |

\* cited by examiner

LIQUID CRYSTAL PANEL AND LIQUID CRYSTAL DISPLAYING DEVICE

CROSS REFERENCE TO RELATED APPLICATIONS

This application claims the priority of Chinese Patent Application No. 201410849413.7, entitled "Liquid Crystal Panel and Liquid Crystal Displaying Device", filed on Dec. 30, 2014, the disclosure of which is incorporated herein by reference in its entirety.

BACKGROUND OF THE INVENTION

1. Field of the Invention

The present invention relates to the field of liquid crystal displaying, and in particular to a liquid crystal panel, a manufacturing method, and a liquid crystal displaying device.

2. The Related Arts

Currently, liquid crystal display devices, serving as display components of electronic devices, have been widely used in various electronic products for liquid crystal displaying. A liquid crystal panel comprises an array substrate and a color filter substrate that are opposite to each other and liquid crystal interposed between the array substrate and the color filter substrate. A resin frame is formed between the color filter substrate and the array substrate to enclose and seal the liquid crystal. Supports are provided between the color filter substrate and the array substrate. As such, the liquid crystal panel comprises a displaying zone, a transition zone surrounding the displaying zone, and the resin frame surrounding the transition zone. During the manufacture, one situation is that metal wiring is arranged on a top or bottom of the resin frame that is in engagement with the panel and non-uniformity of the wiring may cause non-uniformity of the entire size of the resin frame. Another situation is that the density of the supports in the transition zone is small so as to cause excessively large or excessively small compression. Both situations will lead to expansion or reduction of the gap between the array substrate and the color filter substrate in the transition zone. In other words, the glass layer of the array substrate or the color filter substrate that faces the liquid crystal layer may gets deformed, leading to color difference occurring at a perimeter of the displaying zone so as to severely affect the displaying quality of the displaying zone.

SUMMARY OF THE INVENTION

An object of the present invention is to provide a liquid crystal panel that alleviates the issue of color difference occurring at a perimeter of the liquid crystal panel in order to ensure displaying quality of the displaying zone.

The present invention also provides a liquid crystal displaying device.

The present invention provides a liquid crystal panel, which comprises an array substrate and a color filter substrate that is arranged opposite to the array substrate and a liquid crystal layer interposed between the array substrate and the color filter substrate, and an enclosure resin frame surrounding the liquid crystal layer. A support is arranged in the liquid crystal layer of the liquid crystal panel and the support supports between the array substrate and the color filter substrate. The support includes a first support layer and a second support layer connected to the first support layer. The first support layer is made of a thermally deformable material. The second support layer is made of a flexible material of elastic restorability.

In the above liquid crystal panel, the support is in the form of a pillar having a trapezoidal cross section.

In the above liquid crystal panel, the first support layer is made of a heat/light sensitive foaming material and the first support layer is in contact engagement with the array substrate or the color filter substrate.

In the above liquid crystal panel, the heat/light sensitive foaming material comprises a thermoplastic resin material and the thermoplastic resin material is one of fluorine compounds, tetraalkylsilane, and azodicarbonamide.

In the above liquid crystal panel, the first support layer is made of a heat-shrinkable material and the first support layer is in contact engagement with the array substrate or the color filter substrate.

In the above liquid crystal panel, the heat-shrinkable material comprises a heat-shrinkable polyester based heat/light sensitive material and the heat-shrinkable polyester material comprises polylactide compounds or polysiloxane acrylate compounds.

In the above liquid crystal panel, the second support layer is made of a resin polymer material and the resin polymer material comprises aromatic polymers or aliphatic.

In the above liquid crystal panel, the support is heatable to cause deformation of the first support layer and time and temperature of the heating and area are of preset values.

In the above liquid crystal panel, the liquid crystal between the array substrate and the color filter substrate is provided, on the circumference thereof, with a resin frame.

The present invention also provides a liquid crystal displaying device, which comprises a liquid crystal panel. The liquid crystal panel comprises an array substrate and a color filter substrate that is arranged opposite to the array substrate and a liquid crystal layer interposed between the array substrate and the color filter substrate, and an enclosure resin frame surrounding the liquid crystal layer. A support is arranged in the liquid crystal layer of the liquid crystal panel and the support supports between the array substrate and the color filter substrate. The support includes a first support layer and a second support layer connected to the first support layer. The first support layer is made of a thermally deformable material. The second support layer is made of a flexible material of elastic restorability.

In the above liquid crystal displaying device, the support is in the form of a pillar having a trapezoidal cross section.

In the above liquid crystal displaying device, the first support layer is made of a heat/light sensitive foaming material and the first support layer is in contact engagement with the array substrate or the color filter substrate.

In the above liquid crystal displaying device, the heat/light sensitive foaming material comprises a thermoplastic resin material and the thermoplastic resin material is one of fluorine compounds, tetraalkylsilane, and azodicarbonamide.

In the above liquid crystal displaying device, the first support layer is made of a heat-shrinkable material and the first support layer is in contact engagement with the array substrate or the color filter substrate.

In the above liquid crystal displaying device, the heat-shrinkable material comprises a heat-shrinkable polyester based heat/light sensitive material and the heat-shrinkable polyester material comprises polylactide compounds or polysiloxane acrylate compounds.

In the above liquid crystal displaying device, the second support layer is made of a resin polymer material and the resin polymer material comprises aromatic polymers or aliphatic.

In the above liquid crystal displaying device, the second support layer is made of a resin polymer material and the resin polymer material comprises aromatic polymers or aliphatic.

The present invention provides a support arranged at the perimeter of a liquid crystal panel and adopting a dual-layer arrangement. The first support layer that is connected to the array substrate or the color filter substrate is made of a thermally deformable material so that heating through light irradiation would cause the first support layer to heighten or shorten to achieve adjustment of the distance between the array substrate and the color filter substrate thereby alleviating color difference along the perimeter of the liquid crystal panel and improving the displaying quality of the liquid crystal panel.

BRIEF DESCRIPTION OF THE DRAWINGS

To more clearly explain the technical solutions proposed in embodiments of the present invention or those of the prior art, a brief description of the drawings that are necessary for describing the embodiments of the present invention or those of the prior art is given as follows. It is obvious that the drawings that will be described below show only some embodiments of the present invention. For those having ordinary skills of the art, other drawings may also be readily available from these attached drawings without the expense of creative effort and endeavor.

DETAILED DESCRIPTION OF THE PREFERRED EMBODIMENTS

A clear and complete description will be given to technical solutions of the embodiments of the present invention with reference to the attached drawings of the embodiments of the present invention. However, the embodiments so described are only some, but not all, of the embodiments of the present invention. Other embodiments that are available to those having ordinary skills of the art without the expense of creative effort and endeavor are considered belonging to the scope of protection of the present invention.

Figure 1:
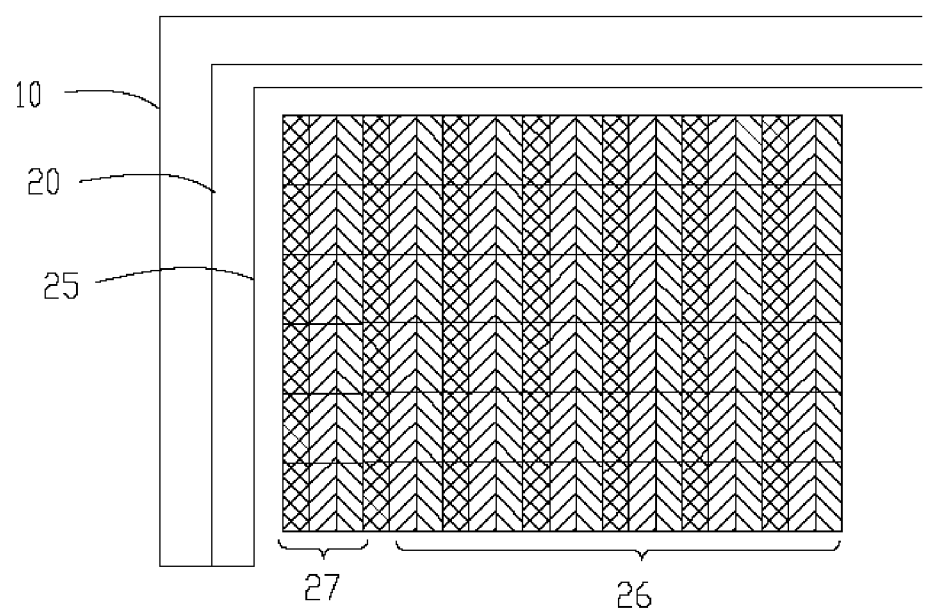
FIG. 1 is a schematic view, taken from a top side, showing a portion of a liquid crystal panel according to the present invention.
Figure 2:
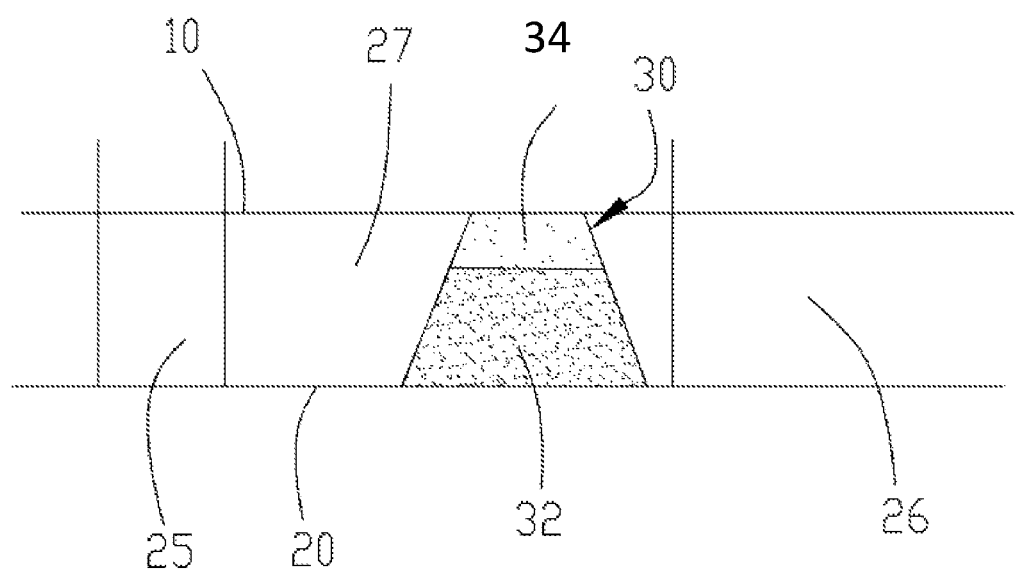
FIG. 2 is a schematic side elevational view showing the liquid crystal panel of FIG. 1.

Referring to FIGS. 1 and 2, a preferred embodiment of the present invention provides a liquid crystal panel, which comprises an array substrate 10 and a color filter substrate 20 that is arranged opposite to the array substrate 10 and a liquid crystal layer (not shown) interposed between the array substrate 10 and the color filter substrate 20, and an enclosure resin frame 25 located between the array substrate 10 and the color filter substrate 20 and arranged along a circumference of the liquid crystal layer. A support 30 is arranged in the liquid crystal layer of the liquid crystal panel and the support 30 supports between the array substrate 10 and the color filter substrate 20. The support 30 comprises a first support layer 32 and a second support layer 34 arranged on the first support layer 32. The first support layer 32 is made of a thermally deformable material and the second support layer 34 is made of a flexible material of elastic restorability.

In the instant embodiment, the liquid crystal panel further comprises a displaying zone 26. The displaying zone 26 of the liquid crystal panel is spaced from the enclosure resin frame 25 by a distance that defines a transition zone 27. The support 30 is located in the transition zone 27. In the present invention, the array substrate and the color filter substrate of an edge area of the liquid crystal panel are taken as an example for illustration. The support 30 is located in the edge of the liquid crystal panel. In other embodiments, the support may be located in the displaying zone of the liquid crystal panel.

Figure 3:
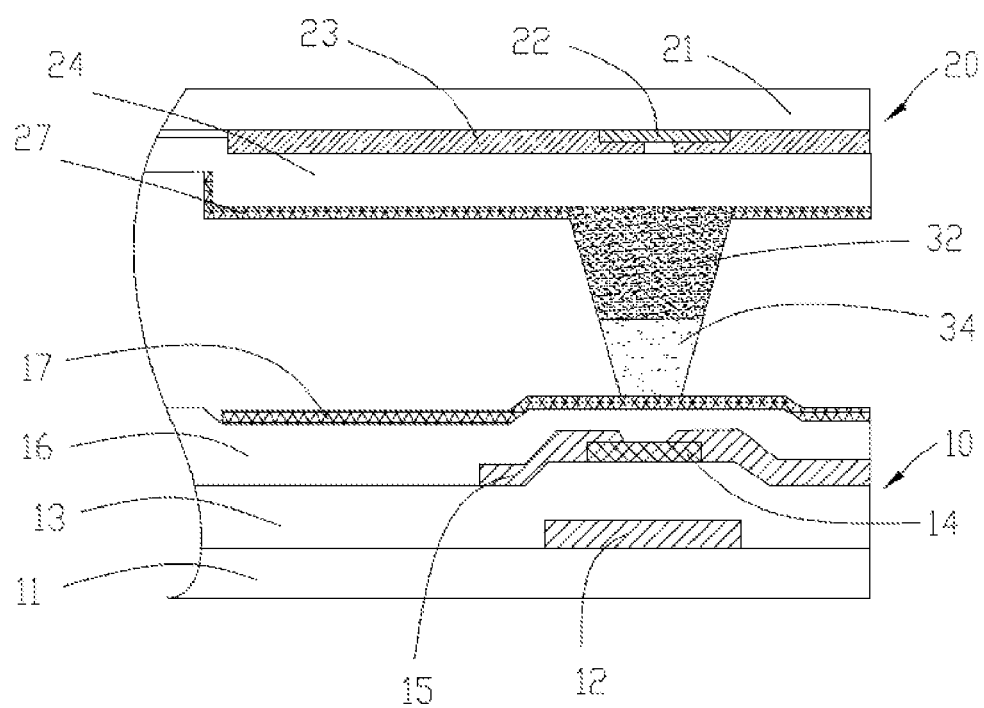
FIG. 3 is a side elevational view, in a sectioned form, showing the liquid crystal panel of FIG. 1.

FIG. 3 is a schematic view illustrating a cross section of the liquid crystal panel according to the present invention and in the drawing, the support 30, the enclosure resin frame 25, the array substrate 10, and the color filter substrate 20 are included. The location where the array substrate 10 and the color filter substrate 20 are is the transition zone 27. The support 30 is in the form of a pillar having a trapezoidal cross section. In the instant embodiment, the first support layer 32 has an area that is greater than that of the second support layer 34.

The array substrate 10 comprises, sequentially arranged, a first glass substrate 11, a gate 12, a gate insulation layer 13, a semiconductor layer 14, source/drain 15, an insulation layer 16, and a first alignment layer 17. The gate 12 is formed on the first glass substrate 11. The gate insulation layer 13 is set on and covers the gate 12 and the first glass substrate 11. The semiconductor layer 14 and the source/drain 15 are located on the gate insulation layer 13 and the semiconductor layer 14 has an orthogonal projection that is exactly cast on the gate 12. The first alignment layer 17 is formed on the insulation layer 16.

The color filter substrate 20 comprises, sequentially arranged, a second glass substrate 21, a pixel unit layer 23, a planarization layer 24, and a second alignment layer 27. The pixel unit layer comprises a black matrix 22 at a location corresponding to the source/drain 15.

In the first embodiment of the present invention, the first support layer 32 is made of a heat/light sensitive foaming material. The heat/light sensitive foaming material includes a thermoplastic resin material. Further, the thermoplastic resin material is one of fluorine compounds, tetraalkylsilane, and azodicarbonamide. The ratio of the first support layer 32 with respect to the support 30 can be determined according to a predicted amount of deformation of the liquid crystal panel. The second support layer 34 is made of a resin polymer material. Further, the resin polymer material can be a material of high elastic restorability, such as aromatic polymers or aliphatic. The support 30 is arranged between the array substrate 10 and the color filter substrate 20 in such a way that the first support layer 32 is in engagement with the planarization layer 24/the second alignment layer and the second support layer 34 is in engagement with the first alignment layer 17. In other embodiments, the first support layer 32 can be formed to contact the insulation layer 16 and the second support layer 34 contacts the second alignment layer 27.

Figure 4:
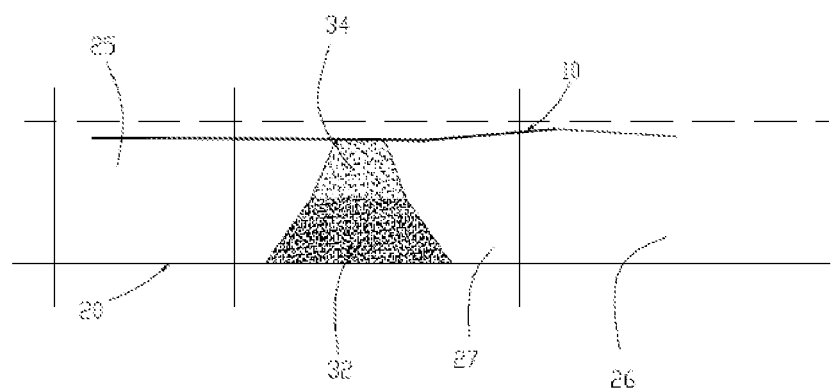
FIG. 4 is a schematic view illustrating a first embodiment of an array substrate of the liquid crystal panel of FIG. 2 in a deformed condition.
Figure 5:
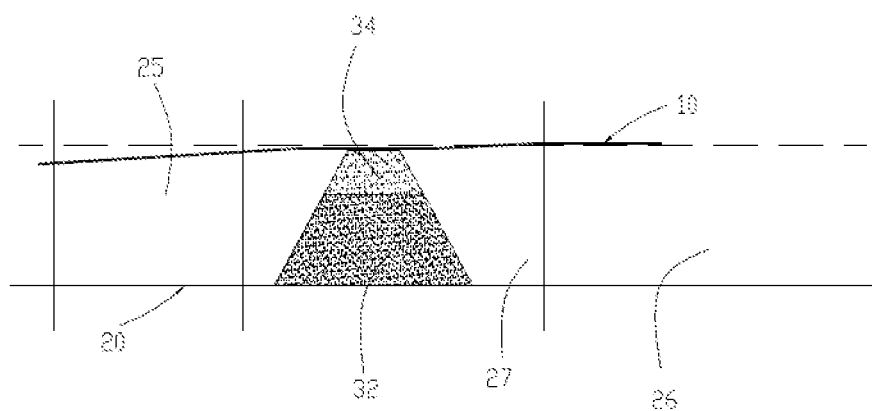
FIG. 5 is a schematic view illustrating a variation condition of an array substrate of the liquid crystal panel of FIG. 4 after a support is irradiated by light.

Referring to FIGS. 4 and 5, taking the first support layer 32 that is made of a heat/light sensitive foaming material as an example, due to size non-uniformity of the enclosure resin frame 25 between the array substrate 10 and the color filter substrate 20, the array substrate 10 or the color filter substrate 20 may be caused to deform. Reduction of the distance between the array substrate 10 and the color filter substrate 20 may thus result. In the instant embodiment, the array substrate 10 being deformed is taken as an example for illustration. Laser irradiation is used and the support 30 at the site of deformation of the enclosure resin frame 25 is subjected to heating through the laser irradiation is such a way that the laser is allowed to only irradiate a necessary portion of the first support layer 32 and the irradiation temperature is only sufficient to have the first support layer 32 positively expanded and the irradiation temperature that causes the expansion of the first support layer 32 is greater than the subsequent support temperature of the liquid crystal panel to ensure the stability of the support. After the laser irradiation, the first support layer 32 of the support 30 gets thermally expanded due to being heated. The overall height of the support 30 is increased, but the second support layer 34 supports the array substrate 10 so as to reduce the amount of deformation of the array substrate 10 thereby achieving the purpose of supporting the deformed the array substrate 10 or the color filter substrate 20 and improving color difference along the perimeter of the liquid crystal panel. Further, the second support layer 34 possess certain elastic restorability and would undergo compression with the expansion of the first support layer 32 so as not to over-support the array substrate 10 and the color filter substrate 20. The time and temperature of heating and the area of the first support layer 32 can be pre-set according to a practical situation in order to effectively prevent breaking and damage of the liquid crystal panel. The expansion starting temperature is at least 130° C. and the material of the first support layer 32 does not react with other materials of the liquid crystal panel.

Another embodiment of the present invention is different from the previous embodiment in that the first support layer 32 is made of a heat-shrinkable material and the heat-shrinkable material comprises a heat-shrinkable polyester heat/light sensitive material, the heat-shrinkable polyester material being polylactide compounds or polysiloxane acrylate compounds. The area of the first support layer 32 is greater than that of the second support layer 34. In the instant embodiment, due to size non-uniformity of the enclosure resin frame 25 between the array substrate 10 and the color filter substrate 20, the array substrate 10 or the color filter substrate 20 may be caused to deform. Expansion of the distance between the array substrate 10 and the color filter substrate 20 may thus result. In the instant embodiment, the array substrate 10 being deformed (not shown) is taken as an example for illustration. Laser irradiation is used and the support 30 at the site of deformation of the enclosure resin frame 25 is subjected to heating through the laser irradiation is such a way that the laser is allowed to only irradiate a necessary portion of the first support layer 32 and the irradiation temperature is only sufficient to have the first support layer 32 positively contracted and the irradiation temperature that causes the contraction of the first support layer 32 is greater than the subsequent support temperature of the liquid crystal panel to ensure the stability of the support. With the support 30 being subjected to laser irradiation and heating, after the laser irradiation, the first support layer 32 of the support 30 gets contracted due to being heated. The overall height of the support 30 is decreased so as to reduce the amount of deformation of the array substrate 10 thereby ensuring the distance between the array substrate 10 and the color filter substrate 20 and improving color difference along the perimeter of the liquid crystal panel. Further, the second support layer 34 possess certain elastic restorability and would undergo elongation with the contraction of the first support layer 32 so as to control the distance between the array substrate 10 and the color filter substrate 20. The time and temperature of heating and the area of the first support layer 32 can be pre-set according to a practical situation in order to effectively prevent breaking and damage of the liquid crystal panel. The expansion starting temperature is at least 130° C. and the material of the first support layer 32 does not react with other materials of the liquid crystal panel.

The present invention also discloses a liquid crystal displaying device that includes the above-described liquid crystal panel.

The present invention provides a support 30 arranged at the perimeter of a liquid crystal panel and adopting a dual-layer arrangement. The first support layer that is connected to the array substrate or the color filter substrate is made of a thermally deformable material so that heating through light irradiation would cause the first support layer to heighten or shorten to achieve adjustment of the distance between the array substrate and the color filter substrate thereby alleviating color difference along the perimeter of the liquid crystal panel and improving the displaying quality of the liquid crystal panel.

The above illustrates only a preferred embodiment according to the present invention and is not intended to limit the scope of right of the present invention. Those having ordinary skills of the art would appreciate that various equivalent modifications that achieve all or some of the operations of the above-described embodiment and fall within scope of the attached claims are considered within the scope covered by the present invention.

What is claimed is:

1. A liquid crystal panel, comprising an array substrate and a color filter substrate that is arranged opposite to the array substrate and a liquid crystal layer interposed between the array substrate and the color filter substrate, and an enclosure resin frame surrounding the liquid crystal layer, wherein a support is arranged in the liquid crystal layer of the liquid crystal panel and the support supports between the array substrate and the color filter substrate, the support comprising a first support layer and a second support layer connected to the first support layer, the first support layer being made of a thermally deformable material, the second support layer being made of a flexible material of elastic restorability;

wherein the first support layer is selectively heated to undergo deformation such that a spacing distance between the array substrate and the color filter is determined by an amount of the deformation of the first support layer.

2. The liquid crystal panel as claimed in claim 1, wherein the support is in the form of a pillar having a trapezoidal cross section.

3. The liquid crystal panel as claimed in claim 2, wherein the first support layer is made of a foaming material that is sensitive to heat induced by irradiation of light and the first support layer is in contact engagement with the array substrate or the color filter substrate.

4. The liquid crystal panel as claimed in claim 3, wherein the foaming material that is sensitive to heat induced by irradiation of light comprises a thermoplastic resin material and the thermoplastic resin material is one of fluorine compounds, tetraalkylsilane, and azodicarbonamide.

5. The liquid crystal panel as claimed in claim 2, wherein the first support layer is made of a heat-shrinkable material and the first support layer is in contact engagement with the array substrate or the color filter substrate.

6. The liquid crystal panel as claimed in claim 5, wherein the heat-shrinkable material comprises a heat-shrinkable polyester based foaming material that is sensitive to heat induced by irradiation of light and the heat-shrinkable polyester material comprises polylactide compounds or polysiloxane acrylate compounds.

7. The liquid crystal panel as claimed in claim 3, wherein the second support layer is made of a resin polymer material and the resin polymer material comprises aromatic polymers or aliphatic.

8. The liquid crystal panel as claimed in claim 6, wherein the second support layer is made of a resin polymer material and the resin polymer material comprises aromatic polymers or aliphatic.

9. The liquid crystal panel as claimed in claim 3, wherein the support is heatable to cause deformation of the first support layer and time and temperature of the heating and area are of preset values.

10. The liquid crystal panel as claimed in claim 6, wherein the support is heatable to cause deformation of the first support layer and time and temperature of the heating and area are of preset values.

11. The liquid crystal panel as claimed in claim 1, wherein the liquid crystal between the array substrate and the color filter substrate is provided, on the circumference thereof, with a resin frame.

12. A liquid crystal displaying device, comprising a liquid crystal panel, the liquid crystal panel comprising an array substrate and a color filter substrate that is arranged opposite to the array substrate and a liquid crystal layer interposed between the array substrate and the color filter substrate, and an enclosure resin frame surrounding the liquid crystal layer, wherein a support is arranged in the liquid crystal layer of the liquid crystal panel and the support supports between the array substrate and the color filter substrate, the support comprising a first support layer and a second support layer connected to the first support layer, the first support layer being made of a thermally deformable material, the second support layer being made of a flexible material of elastic restorability;
wherein the first support layer is selectively heated to receive undergo deformation such that a spacing distance between the array substrate and the color filter is determined by an amount of the deformation of the first support layer.

13. The liquid crystal displaying device as claimed in claim 12, wherein the support is in the form of a pillar having a trapezoidal cross section.

14. The liquid crystal displaying device as claimed in claim 13, wherein the first support layer is made of a foaming material that is sensitive to heat induced by irradiation of light and the first support layer is in contact engagement with the array substrate or the color filter substrate.

15. The liquid crystal displaying device as claimed in claim 14, wherein the foaming material that is sensitive to heat induced by irradiation of light comprises a thermoplastic resin material and the thermoplastic resin material is one of fluorine compounds, tetraalkylsilane, and azodicarbonamide.

16. The liquid crystal displaying device as claimed in claim 13, wherein the first support layer is made of a heat-shrinkable material and the first support layer is in contact engagement with the array substrate or the color filter substrate.

17. The liquid crystal displaying device as claimed in claim 16, wherein the heat-shrinkable material comprises a heat-shrinkable polyester based foaming material that is sensitive to heat induced by irradiation of light and the heat-shrinkable polyester material comprises polylactide compounds or polysiloxane acrylate compounds.

18. The liquid crystal displaying device as claimed in claim 14, wherein the second support layer is made of a resin polymer material and the resin polymer material comprises aromatic polymers or aliphatic.

19. The liquid crystal displaying device as claimed in claim 17, wherein the second support layer is made of a resin polymer material and the resin polymer material comprises aromatic polymers or aliphatic.

* * * * *